(12) United States Patent
Hasegawa et al.

(10) Patent No.: US 10,930,444 B2
(45) Date of Patent: Feb. 23, 2021

(54) ELECTROCHEMICAL DEVICE

(71) Applicant: TDK CORPORATION, Tokyo (JP)

(72) Inventors: Hiroaki Hasegawa, Tokyo (JP); Hidetake Itoh, Tokyo (JP); Yoshihiko Ohashi, Tokyo (JP); Yuji Yoshino, Tokyo (JP); Kazunori Yoshikawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 14 days.

(21) Appl. No.: 16/273,561

(22) Filed: Feb. 12, 2019

(65) Prior Publication Data

US 2019/0267197 A1    Aug. 29, 2019

(30) Foreign Application Priority Data

Feb. 23, 2018    (JP) .................................. 2018-031235

(51) Int. Cl.
*H01G 11/80*    (2013.01)
*H01G 11/26*    (2013.01)
*H01G 11/82*    (2013.01)
*H01G 11/74*    (2013.01)
*H01G 11/52*    (2013.01)

(52) U.S. Cl.
CPC ............. *H01G 11/80* (2013.01); *H01G 11/26* (2013.01); *H01G 11/52* (2013.01); *H01G 11/74* (2013.01); *H01G 11/82* (2013.01)

(58) Field of Classification Search
CPC ......... H01G 11/66; H01G 11/78; H01G 11/80
See application file for complete search history.

(56) References Cited

U.S. PATENT DOCUMENTS

| | | | |
|---|---|---|---|
| 2006/0274480 A1* | 12/2006 | Kosuda ................. | H01G 11/58 361/502 |
| 2011/0086264 A1 | 4/2011 | Tsukamoto et al. | |
| 2015/0103470 A1* | 4/2015 | Saya ..................... | H01G 11/26 361/502 |

FOREIGN PATENT DOCUMENTS

| | | |
|---|---|---|
| CN | 102082029 A | 6/2011 |
| JP | 2011-082394 A | 4/2011 |
| JP | 2014-072348 A | 4/2014 |
| JP | 2015-079836 A | 4/2015 |

* cited by examiner

*Primary Examiner* — Eric W Thomas
(74) *Attorney, Agent, or Firm* — Oliff PLC

(57) ABSTRACT

An electrochemical device includes an element body, an exterior sheet, a seal part, and a leading terminal. The element body includes a pair of inner electrodes laminated to sandwich a separator sheet. The exterior sheet covers the element body. The seal part seals a peripheral part of the exterior sheet for immersing the element body in an electrolyte. The leading terminal extends outward from the seal part of the exterior sheet. The exterior sheet includes a front sheet and a back sheet. The front sheet includes a front-side metal sheet. The back sheet includes a back-side metal sheet.

10 Claims, 13 Drawing Sheets

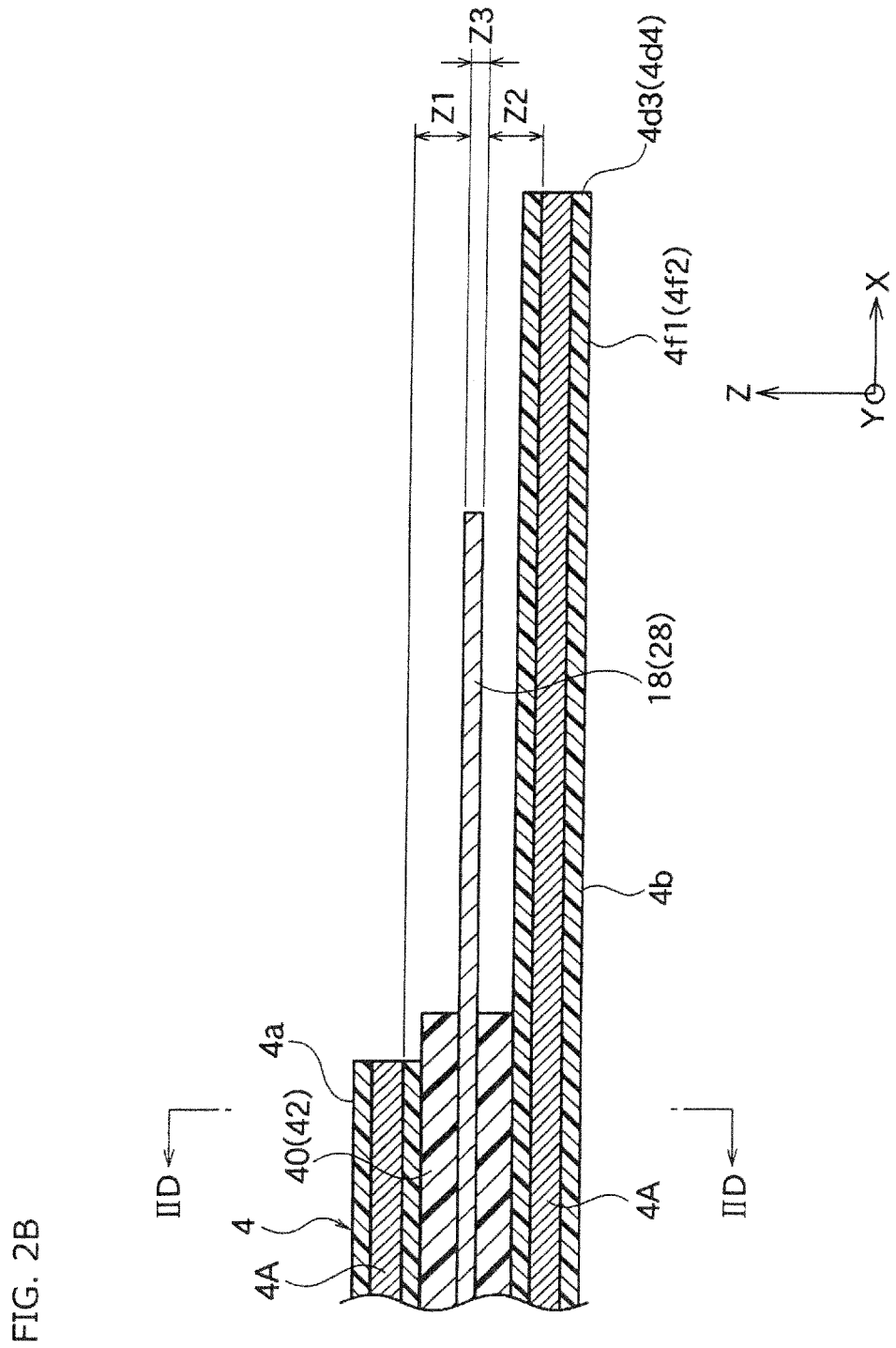

ELECTROCHEMICAL DEVICE

BACKGROUND OF THE INVENTION

Field of the Invention

The present invention relates to an electrochemical device that is favorably used as an electric double-layer capacitor (EDLC) or so.

Description of the Related Art

For example, as also shown in Patent Document 1, an ultrathin electrochemical device is gathering attention according to application in IC cards or so. The electrochemical device contains an electrolyte composed of salt (ionic substance) and solvent. If the electrolyte diffuses to the outside, the electrolyte is in short, and the device may have a short lifetime.

Patent Document 1: JP2015-79836 (A)

SUMMARY OF THE INVENTION

The present invention is accomplished based on this circumstance. It is an object of the invention to provide an electrochemical device capable of increasing lifetime.

To achieve the above object, an electrochemical device according to the present invention includes:

an element body including a pair of inner electrodes laminated to sandwich a separator sheet;

an exterior sheet configured to cover the element body;

a seal part configured to seal a peripheral part of the exterior sheet for immersing the element body in an electrolyte; and a leading terminal extending outward through the seal part of the exterior sheet, wherein the exterior sheet includes a front sheet and a back sheet, the front sheet includes a front-side metal sheet, the back sheet includes a back-side metal sheet, and $Z1+Z2$ is 60 µm or less and $(Z1+Z2)/Z3$ is 0.5 or more and 6.0 or less at a position of the seal part through which the leading terminal extends, in which $Z1$ is a first thickness of the seal part from a front surface of the leading terminal to the front-side metal sheet, $Z2$ is a second thickness of the seal part from a back surface of the leading terminal to the back-side metal sheet, and $Z3$ is a thickness of the leading terminal.

The present inventors have found that a device can have a long lifetime by particularly satisfying a predetermined relation between a thickness of a seal part through which a terminal extends and a thickness of the terminal. Then, the prevent invention has been achieved. Each of the front sheet and the back sheet includes the metal sheet. Thus, the electrolyte is unlikely to permeate the front sheet itself and the back sheet itself and diffuse to the outside, and the electrolyte is likely to diffuse to the outside via the seal part.

The seal part is particularly thick at a portion through which the leading terminal extends. The electrochemical device of the present invention can have a long lifetime by satisfying a predetermined relation between a thickness of the terminal and a thickness of the seal part at a position through which the terminal extends.

Preferably, the thickness $Z3$ of the leading terminal is 60 µm or less. When the thickness $Z3$ is small, the device can have a long lifetime.

Preferably, a current collector layer of the inner electrode is formed continuously and integrally with the leading terminal. This structure can easily reduce a thickness of the leading terminal.

Preferably, the seal part from the front-side metal sheet to the back-side metal sheet has a thickness of 50 µm or less at a position of the seal part through which the leading terminal does not extend. This structure can also prevent a diffusion of the electrolyte from the seal part at a position through which the leading terminal does not extend and can further increase a lifetime of the device.

Preferably, a leading end part of the back sheet extends outward from a leading end part of the leading terminal in a extending direction of the leading terminal and also functions as a support tab, and a leading end part of the front sheet is positioned inside the leading end part of the leading terminal in the extending direction of the leading terminal. When the support tab is formed, the leading terminal to be disposed on the support tab can effectively be protected.

BRIEF DESCRIPTION OF THE DRAWINGS

FIG. 2B is an enlarged cross-sectional view of a main part of a seal part shown in FIG. 2A;

DETAILED DESCRIPTION OF THE PREFERRED EMBODIMENTS

The present invention is described below based on the embodiments shown in the figures.

First Embodiment

Figure 1A:
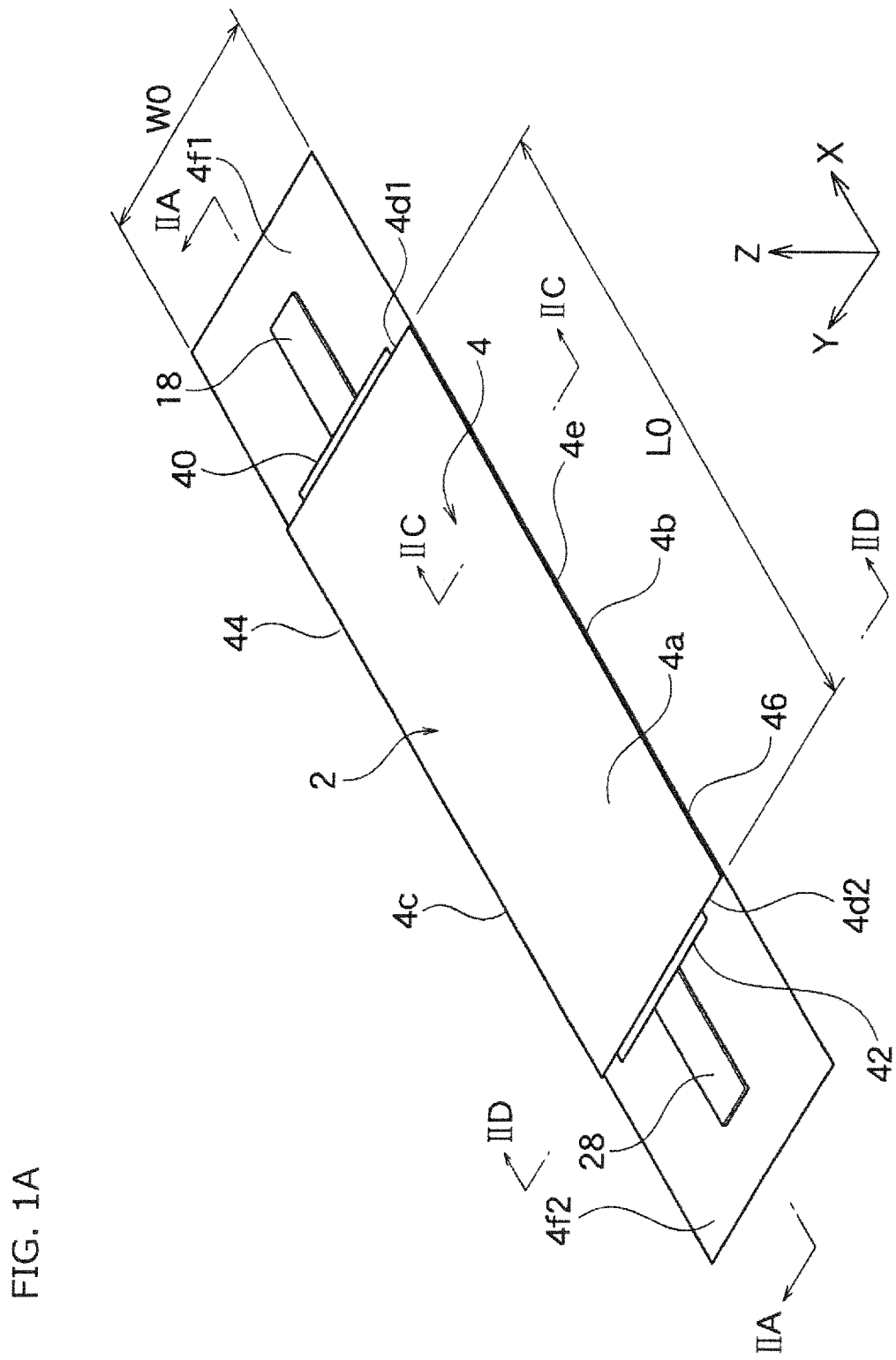
FIG. 1A is a perspective view of an electric double-layer capacitor of an embodiment of the present invention.

As shown in FIG. 1A, an electric double-layer capacitor (EDLC) 2 used as an electrochemical device of an embodiment of the present invention includes an exterior sheet 4. The exterior sheet 4 includes a front sheet 4a and a back sheet 4b formed by folding a piece of sheet at a folded-back peripheral part 4c. Moreover, the exterior sheet 4 may also be formed by sticking independent upper and lower sheets together without folding back the front sheet 4a and the back sheet 4b.

In the present embodiment, the exterior sheet 4 has a rectangular shape where a length L0 in an X-axis direction is longer than a length W0 in a Y-axis direction, but may have other shapes, such as square, other polygons, circle, and ellipse. In this embodiment, the thickness direction (Z-axis direction) is a direction where the front sheet 4a and the back sheet 4b of the exterior sheet 4 are overlapped with each other, and the X-axis and the Y-axis are a direction orthogonal to the thickness direction.

Figure 2A:
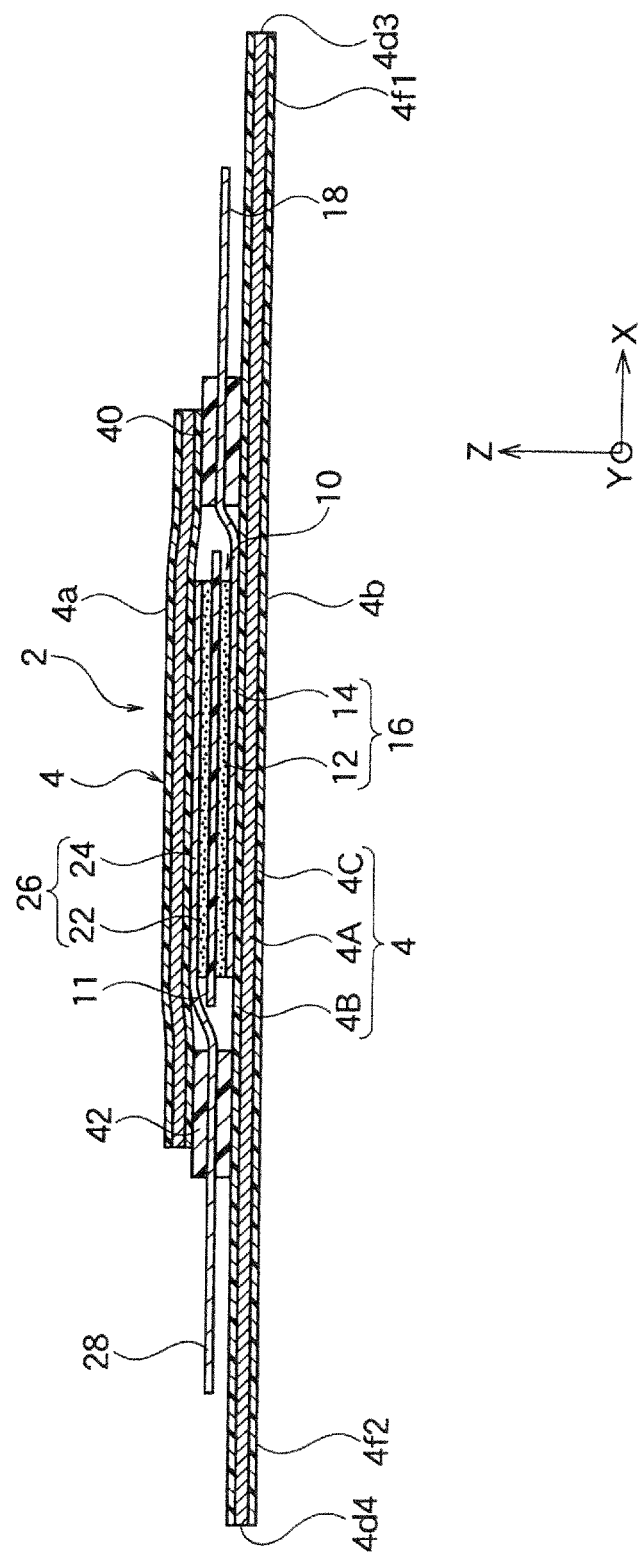
FIG. 2A is a schematic cross-sectional view taken along a line IIA-IIA of FIG. 1A.

As shown in FIG. 2A, an element body 10 is housed in the exterior sheet 4. The element body 10 corresponds to an element of the electric double-layer capacitor, and a single capacitor element is accommodated in the exterior sheet 4 in the present embodiment.

In the element body 10, a pair of first inner electrode 16 and second inner electrode 26 are laminated (arranged) so as to sandwich a separator sheet 11 permeated with an electrolyte. One of the first inner electrode 16 and the second inner electrode 26 is a positive electrode and the other one is a negative electrode, but the configurations are the same. The first inner electrode 16 and the second inner electrode 26 include a first active layer 12 and a second active layer 22, respectively. The first active layer 12 and the second active layer 22 are laminated so as to contact with each of mutually opposite surfaces of the separator sheet 11. In addition, the first inner electrode 16 and the second inner electrode 26 have a first current collector layer 14 and a second current collector layer 24, respectively. The first current collector layer 14 and the second current collector layer 24 are laminated so as to contact with each of the active layers 12 and 22.

The separator sheet 11 is configured so that the inner electrodes 16 and 26 are electrically insulated and that an electrolyte can penetrate. For example, the separator sheet 11 is formed by an electric insulation porous sheet. The electric insulation porous sheet includes a monolayer body or a laminated body of a film containing polyethylene, polypropylene or polyolefin, a stretched film of mixture of the above resins, or a fiber non-woven fabric consisting of at least one kind of constituent material selected from a group consisting of cellulose, polyester, and polypropylene. For example, the separator sheet 11 has a thickness of about 5 to 50 μm.

Generally, the current collector layers 14 and 24 are made of any material having a high conductivity, but are preferably made of a metal material having a low electric resistance, such as a sheet of copper, aluminum, nickel, etc. Each of the current collector layers 14 and 24 has a thickness of, for example, about 10 to 100 μm, but preferably has a thickness of 60 μm or less and more preferably has a thickness of 15 to 60 μm. The width of the current collector layers 14 and 24 in the Y-axis direction is preferably 2 to 10 mm and is preferably smaller than the width of the separator sheet 11 in the Y-axis direction. The current collector layers 14 and 24 are preferably arranged in the center of the separator sheet 11 in the Y-axis direction.

The active layers 12 and 22 contain an active material and a binder, and preferably contain a conductive assistant. The active layers 12 and 22 are laminated and formed on the surfaces of the sheets constituting the respective current collector layers 14 and 24.

The active material includes porous bodies having various electronic conductivities, such as carbon materials of activated carbon, natural graphite, artificial graphite, meso-carbon microbeads, meso-carbon fiber (MCF), cokes, glass-like carbon, and organic compound fired body. The binder may be various binding agents as long as the active material, preferably the conductive assistant, can be fixed on the sheets constituting the current collector layers. For example, the binder is a fluorine resin of polyvinylidene fluoride (PVDF), polytetrafluoroethylene (PTFE), etc., a mixture of styrene-butadiene rubber (SBR) and water-soluble polymer (carboxymethyl cellulose, polyvinyl alcohol, sodium polyacrylate, dextrin, gluten, etc.), or the like.

The conductive assistant is a material added to improve the electronic conductivity of the active layers 12 and 22. Examples of the conductive assistant include a carbon material, such as carbon black and acetylene black, a fine metal powder of copper, nickel, stainless, iron, etc., a mixture of the carbon material and the fine metal powder, and a conductive oxide of ITO etc.

Each thickness of the active layers 12 and 22 is preferably, for example, about 1 to 100 μm. The active layers 12 and 22 are formed on each surface of the current collector layers 14 and 24 with a surface area equivalent to or less than that of the separator sheet 11. The active layers 12 and 22 can be manufactured by a publicly known method.

In the present embodiment, the "positive electrode" refers to an electrode on which anions in the electrolyte are adsorbed when a voltage is applied to the electric double-layer capacitor, and the "negative electrode" refers to an electrode on which cations in the electrolyte are adsorbed when a voltage is applied to the electric double-layer capacitor. Moreover, when the electric double-layer capacitor is recharged after once being charged by applying a voltage in a specified positive and negative direction, the recharge is normally performed in the same direction as the first one and is hardly performed by applying a voltage in the opposite direction.

Preferably, the exterior sheet 4 is composed of the following material where the electrolyte does not permeate. In addition, the exterior sheet 4 is preferably configured so that the peripheral parts of the exterior sheets 4 are integrated with each other by heat sealing or the exterior sheets 4 are integrated by a sealing tape 40a (the same applies to a case in which 42a is included) shown in FIG. 4A by heat sealing. In view of workability, the sealing tape 40a preferably has a tape shape, such as an adhesive tape. However, the sealing tape 40a may not be a tape and may also be a coatable sealant resin or take any form as long as it is melted and bondable.

The exterior sheet 4 is configured to seal the element body 10 and prevent air and moisture from entering the inside of the sheet 4. Specifically, the exterior sheet 4 may be a single-layer sheet, but is preferably a multilayer sheet laminated so that a metal sheet 4A is sandwiched by an inner layer 4B and an outer layer 4C as shown in FIG. 2A.

The metal sheet 4A is preferably composed of aluminum (Al), stainless, or the like. The inner layer 4B is preferably composed by an electric insulation material that is similar to polypropylene or so, which hardly reacts with the electrolyte and is capable of heat sealing. The outer layer 4C is composed of any material, but is preferably composed of PET, PC, PES, PEN, PI, fluorine resin, PE, polybutylene terephthalate (PBT), etc. Preferably, the exterior sheet 4 has a thickness of 5 to 150 μm.

In this embodiment, the bearing ability of the exterior sheet 4 is 390-1275 N/mm$^2$, preferably 785 to 980 N/mm$^2$ in JIS Z2241. In addition, the hardness of the exterior sheet is 230 to 480, preferably 280 to 380 in vickers hardness (Hv) (JIS 2244). From this viewpoint, the metal sheet 4A of the exterior sheet 4 is preferably a stainless steel SUS304 (BA), SUS304 (1/2H), SUS304 H, SUS301 BA, SUS301 (1/2H), and SUS301 (3/4H) specified in JIS.

Leading terminals 18 and 28 are a conductive member that functions as current input and output terminals for the current collector layers 14 and 24 and have a rectangular plate shape. In the present embodiment, each of the leading terminals 18 and 28 is formed by a sheet integrated with a conductive sheet constituting each of the current collector layers 14 and 24, and may have the same thickness as each of the current collector layers 14 and 24. However, each of the leading terminals 18 and 28 may also be formed by a different conductive member from each of the current collector layers 14 and 24 and may electrically be connected to each of the current collector layers 14 and 24. In that case, each of the leading terminals 18 and 28 may have a different thickness from each of the current collector layers 14 and 24 and has a thickness of about 10 to 100 µm, preferably 60 µm or less, more preferably 20 to 60 µm, for example.

Figure 2C:
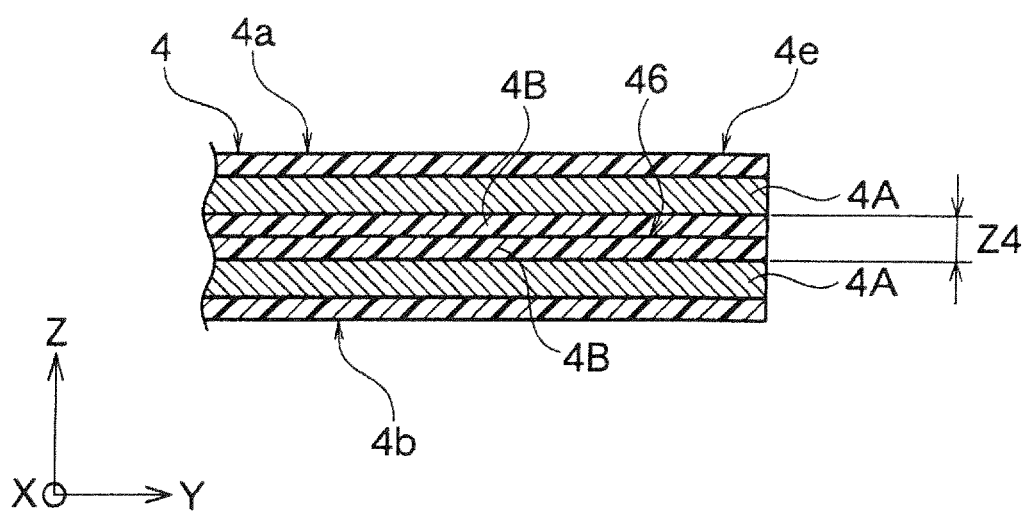
FIG. 2C is an enlarged cross-sectional view of a main part taken along a line IIC-IIC of FIG. 1A.
Figure 2D:
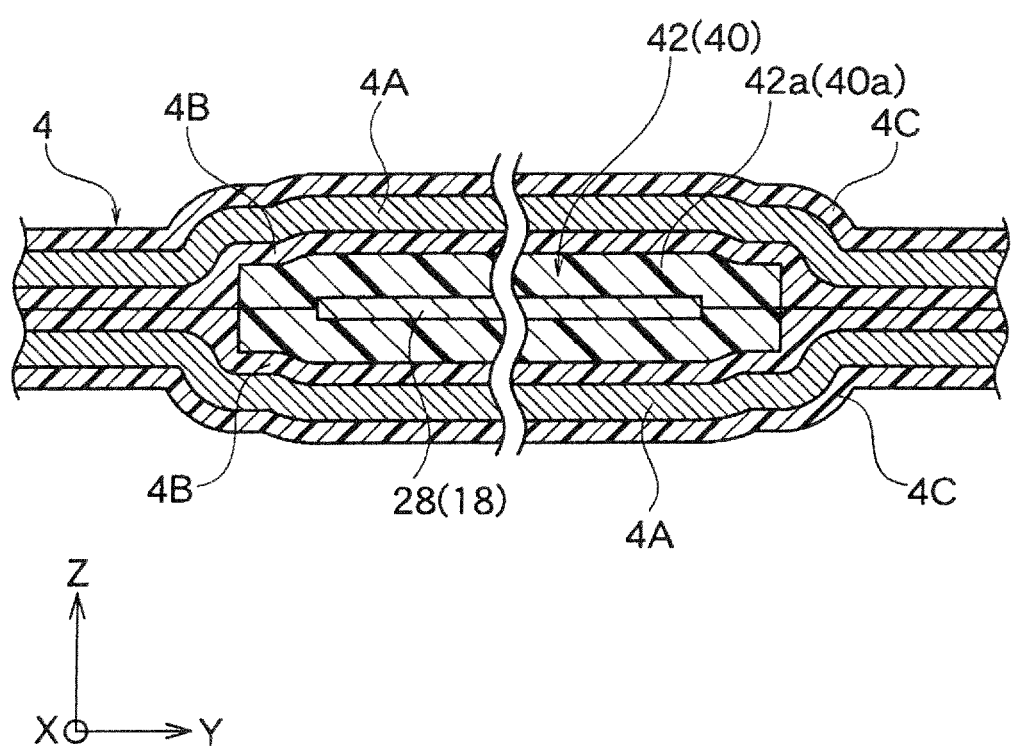
FIG. 2D is an enlarged cross-sectional view of a main part taken along a line IID-IID of FIG. 1A.

As shown in FIG. 2A, the leading terminals 18 and 28 extend along support tabs 4f1 and 4f2 from the mutually opposite sides of the element body 10 in the X-axis direction, and the element body 10 is sealed by a first seal part 40 and a second seal part 42. The first seal part 40 and the second seal part 42 are formed in such a manner that the sealing tapes 40a and 42a shown in FIG. 4A and FIG. 4B described below and the inner layer 4B of the exterior sheet 4 shown in FIG. 2A are integrated by heat sealing. That is, as shown in FIG. 2D, a portion of the inner layer (resin) 4B formed on an inner peripheral surface of the exterior sheet 4 is adhered to both surfaces of the leading terminals 18 and 28 in the Y-axis direction along with the sealing tapes 40a and 42a and is turned into a heat welding part. This heat welding part improves a sealing performance of the first seal part 40 and the second seal part 42.

As shown in FIG. 1A, the leading terminals 18 and 28 do not extend from a third seal part 44. In the third seal part 44, the exterior sheet 4 is folded at the folded-back peripheral part 4c, and the inner layers 4B of the exterior sheet 4 are fused and integrated by heat sealing. Similarly, the leading terminals 18 and 28 do not extend from a fourth seal part 46. In the fourth seal part 46, as shown in FIG. 2C, the inner layers 4B of the side peripheral parts 4e in the front sheet 4a and the back sheet 4b of the exterior sheet 4 are fused and integrated by heat sealing.

As shown in FIG. 1A, the third seal part 44 and the fourth seal part 46 are formed so as to be continuous with the first seal part 40 by connecting one end of the third seal part 44 and one end of the fourth seal part 46 to each end of the first seal part 40 in the Y-axis direction respectively. The second seal part 42 is continuously formed so as to be continuous with the third seal part 44 and the fourth seal part 46 by connecting the second seal part 42 to the other end of the third seal part 44 and the other end of the fourth seal part 46. Thus, the exterior sheet 4 is favorably sealed and isolated from the outside of the exterior sheet 4.

An electrolyte (not shown) is filled in a space that is sandwiched by the exterior sheet 4 and is for sealing the element body 10 by the seal parts 40, 42, 44, and 46. A part of the electrolyte is impregnated in the active layers 12 and 22 and the separator sheet 11 shown in FIG. 2A.

The electrolyte made by dissolving an electrolyte salt in an organic solvent is used. The electrolyte salt is preferably, for example, quaternary ammonium salt such as tetraethyl ammonium tetrafluoroborate ($TEA^+$ $BF^{4-}$) and triethyl monomethyl ammonium tetrafluoroborate ($TEMA^+$ $BF^{4-}$), ammonium salts, amine salts, amidine salts, or the like.

Incidentally, one of these electrolyte salts may be used independently, or two or more of these electrolyte salts may be used in combination.

The organic solvent is a publicly known solvent. For example, the organic solvent is preferably propylene carbonate, ethylene carbonate, dimethyl carbonate, methyl ethyl carbonate, diethyl carbonate, γ-butyrolactone, dimethylformamide, sulfolane, acetonitrile, propionitrile, methoxy acetonitrile, or the like. These organic solvents may be used independently, or two or more these organic solvents may be mixed in any ratio to be used.

As shown in FIG. 2A, the leading ends of the leading terminals 18 and 28 are respectively extended through the first seal part 40 and the second seal part 42 to the outside of the first seal part 40 and the second seal part 42. The first seal part 40 and the second seal part 42 are a portion where each of the leading terminals 18 and 28 are extended outward and are a portion where the sealing performance is particularly required compared with the third seal part 44 and the fourth seal part 46.

In the EDLC 2 of the present embodiment, the first leading terminal 18 and the second leading terminal 28 of the element body 10 are extended to opposite sides in the longitudinal direction (X-axis direction) of the EDLC 2. Thus, the width of the EDLC 2 in the Y-axis direction can be reduced, the thickness of the first seal part 40 and the second seal part 42 can be reduced to a required minimum, and the thickness of the EDLC 2 can also be reduced overall. Miniaturization and thinning of the EDLC 2 can thereby be achieved.

In the EDLC 2 of the present embodiment, for example, the first leading terminal 18 and the second leading terminal 28 are respectively set as a positive electrode and a negative electrode, and both of the terminals are connected to the element body 10 immersed in the electrolyte. In EDLCs, it is determined that a withstand voltage of a single element is about 2.85 V at the maximum, and the elements may be connected in series for improvement in withstand voltage depending on the application. The EDLC 2 of the present embodiment has an extremely small thickness and a sufficient withstand voltage and can thereby appropriately be used as an EDLC built in thin electronic components, such as IC cards.

In particular, as shown in FIG. 2B, the present embodiment satisfies the following formula at a position of the seal part 40 (42) through which the leading terminal 18 (28) extends, when Z1 is a first thickness of the seal part 40 (42) from the surface of the leading terminal 18 (28) to the front-side metal sheet 4A, Z2 is a second thickness of the seal part 40 (42) from the back surface of the leading terminal 18 (28) to the back-side metal sheet 4A, and Z3 is a thickness of the leading terminal 18 (28). That is, $Z1+Z2$ is 60 µm or less (preferably 15 to 60 µm), and $(Z1+Z2)/Z3$ is 0.5 or more and 6.0 or less.

The first thickness Z1 and the second thickness Z2 are approximately the same in the present embodiment, but are not necessarily the same. For example, the first thickness Z1 corresponds to a thickness of the sealing tape 40a and the inner layers 4B shown in FIG. 3, and the second thickness Z2 corresponds to a thickness of the inner layers 4B shown in FIG. 3. The opposite case may also be acceptable (a thickness corresponding to the first thickness Z1 and a thickness corresponding to the second thickness Z2 may be reversed).

In the present embodiment, by keeping the terminal thickness Z3 and the thickness (Z1+Z2) of the seal part 40 (42) at a position where the terminal 18 (28) extends outward in a predetermined relation, the EDLC 2 can have a long lifetime. Each of the front sheet 4a and the back sheet 4b includes the metal sheet 4A. Thus, the electrolyte is unlikely to permeate the front sheet 4a and the back sheet 4b and diffuse to the outside, and the electrolyte is likely to diffuse to the outside via the seal parts 40 and 42.

The seal parts are particularly thick at a portion where the leading terminal 18 (28) extends outward. In the present embodiment, by keeping the terminal thickness Z3 and the thickness (Z1+Z2) of the seal part 40 (42) at a position where the terminal 18 (28) extends outward in the above-mentioned predetermined relation, the EDLC 2 can have a long lifetime.

In the present embodiment, the thickness Z3 of the leading terminal 18 (28) is 60 μm or less (preferably 40 μm or less). By reducing the thickness Z3, the device can have a long lifetime. To maintain the strength of the leading terminals, however, the thickness Z3 of the leading terminals is preferably 20 μm or more.

As shown in FIG. 2C, a thickness Z4 of the seal part 46 which corresponds to a thickness from the front-side metal sheet 4A to the back-side metal sheet 4A at a position of the seal part 46 (the same applies to the seal part 44) where the leading terminal does not extends outward is 50 μm or less. This structure can also prevent a diffusion of the electrolyte from the seal part 46 at a position where the leading terminal extends outward and can further increase a lifetime of EDLC 2. To improve the sealing performance, the seal parts preferably have a thickness of 10 μm or more.

In the present embodiment, as shown in FIG. 2B, the leading end part 4d3 (4d4) of the back sheet 4b extends outward from the leading end part of the leading terminal 18 (28) in the extending direction (X-axis direction) of the leading terminal 18 (28) and also functions as the support tab 4f1 (4f2). The leading end part of the front sheet 4a is positioned inside the leading end part of the leading terminal 18 (28) in the extending direction of the leading terminal 18 (28). By forming the support tab 4f1 (4f2), the leading terminal 18 (28) disposed on the support tab 4f1 (4f2) can effectively be protected.

Figure 3:
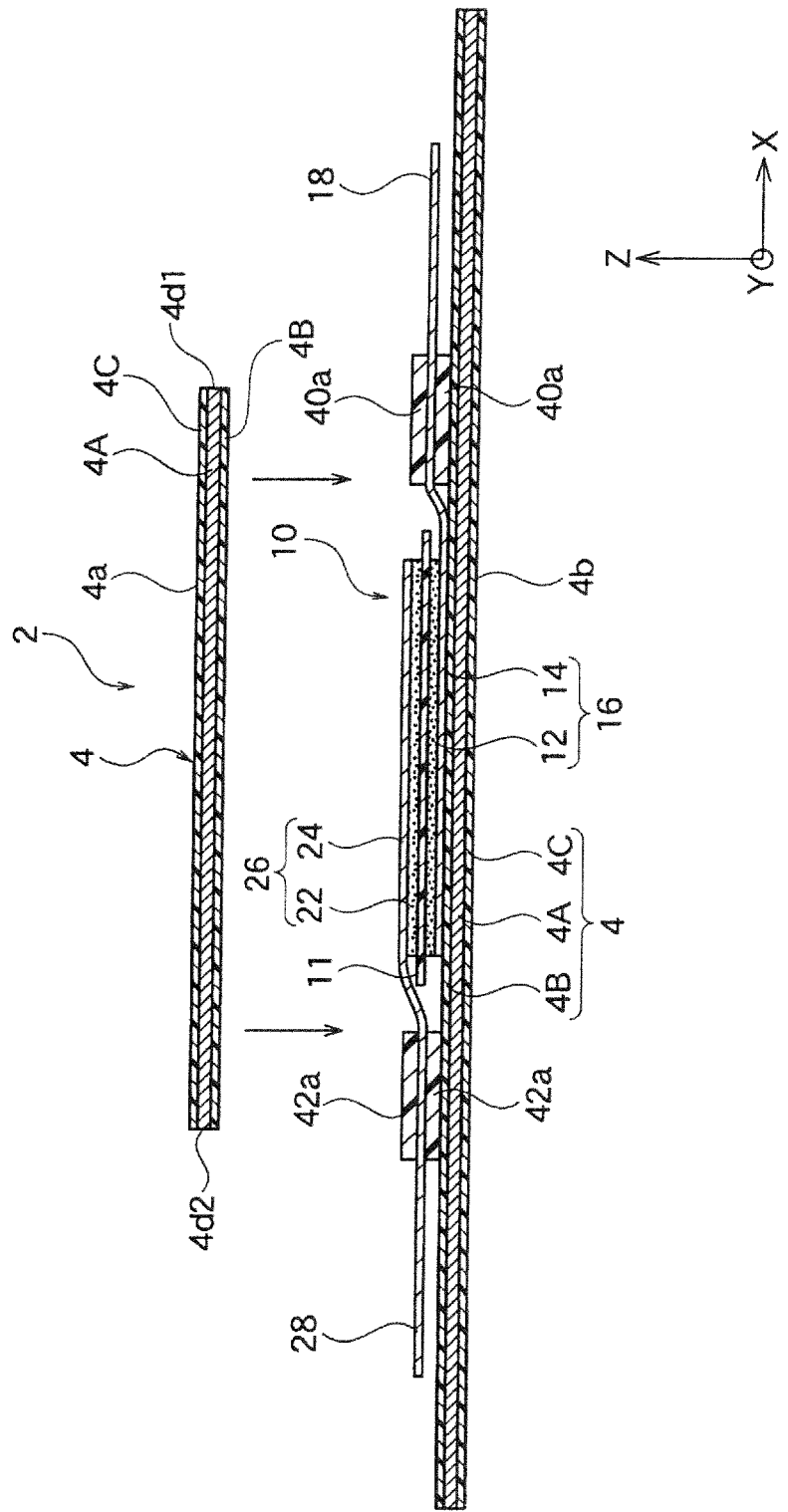
FIG. 3 is a cross-sectional view showing a method of manufacturing the electric double-layer capacitor shown in FIG. 2A.
Figure 4A:
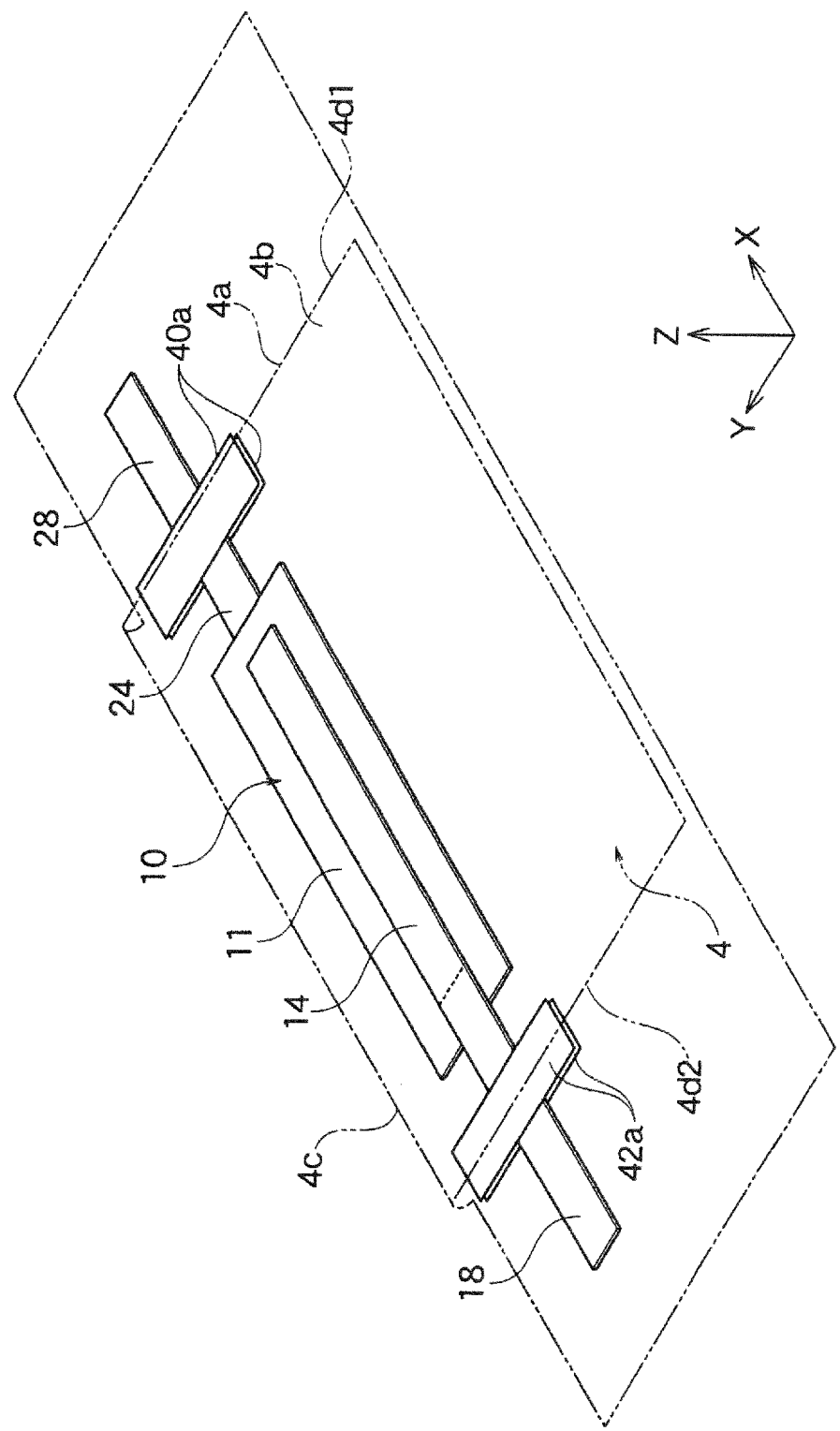
FIG. 4A is a schematic perspective view showing the method corresponding to FIG. 3.
Figure 4B:
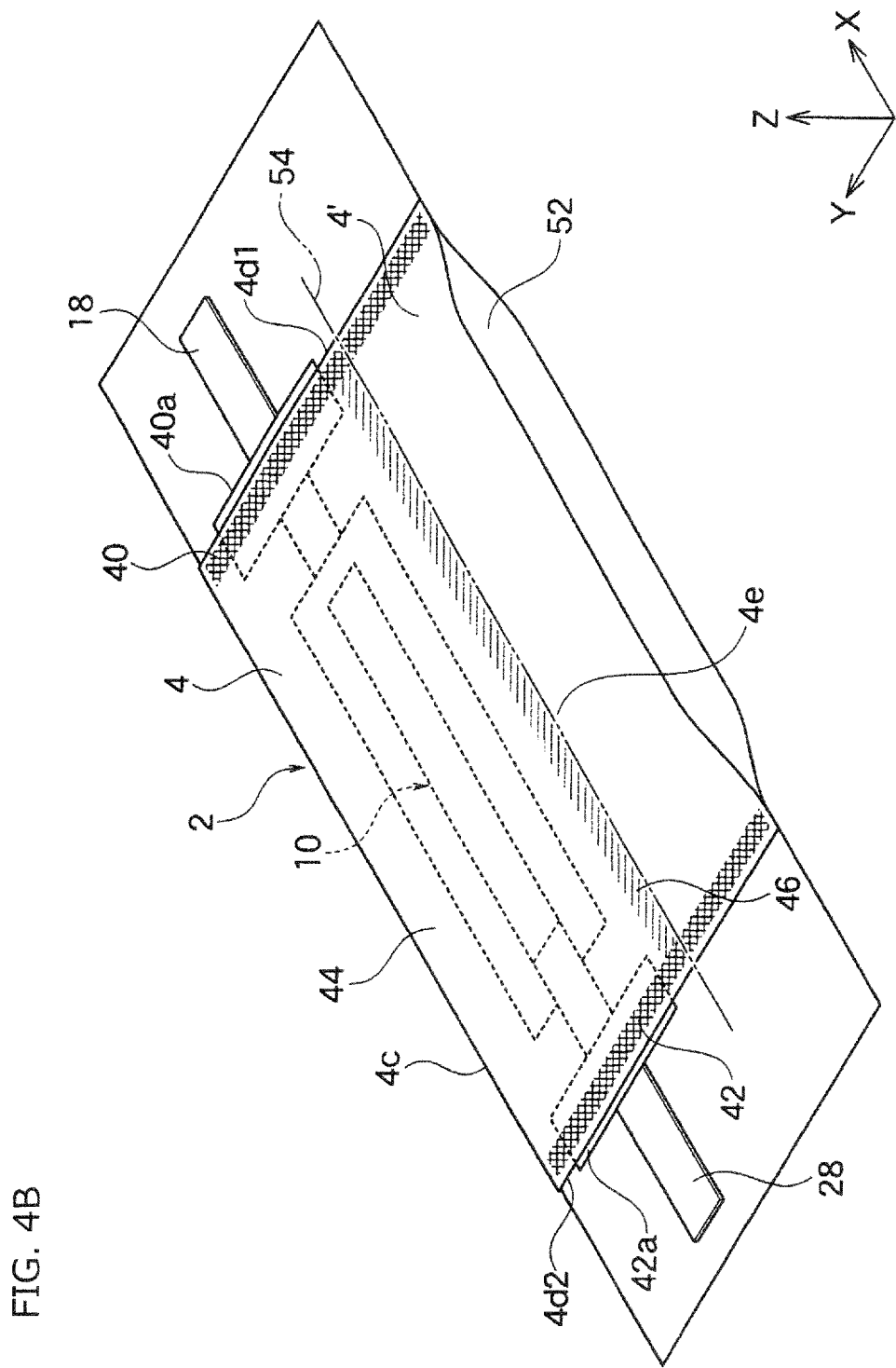
FIG. 4B is a perspective view showing the next step of FIG. 4A.

Next, a method of manufacturing the EDLC 2 of the present embodiment is explained with FIG. 3 to FIG. 4B.

As shown in FIG. 3 and FIG. 4A, the element body 10 is initially manufactured. To manufacture the element body 10, the electrode 16 (one of electrodes) is prepared, and the tape 40a is attached on a boundary part of the electrode 16 and the leading terminal 18. In addition, the electrode 26 (the other electrode) is prepared, and the tape 42a is attached on the boundary part of the electrode 26 and the leading terminal 28. Then, the separator sheet 11 is disposed between the electrode 16 and the electrode 26.

The sealing tape 40a (42a) is adhered to the surface on one side or the surfaces on both sides of the terminal 18 (28) at a position in the X-axis direction where the first seal part 40 (the second seal part 42) described above is formed. The width of the tape 40a (42a) in the Y-axis direction is longer than the width of the leading terminal 18 (28) in the Y-axis direction.

Next, the exterior sheet 4 is folded at the folded-back peripheral part 4c so that the entire element body 10 is covered, and the element body 10 is covered by the front sheet 4a and the back sheet 4b of the sheet 4. Incidentally, the exterior sheet 4 is formed long in the Y-axis direction in advance. The width of the front sheet 4a of the exterior sheet 4 in the X-axis direction is adjusted in a manner that a leading end part 4d1 (4d2) of the front sheet 4a in the X-axis direction is located inside the tape 40a (42a) in the X-axis direction. Moreover, the exterior sheet 4 may also be formed by sticking independent upper and lower sheets together without folding the front sheet 4a and the back sheet 4b.

To form the first seal part 40 and the second seal part 42 as shown in FIG. 4B, at a location where the tapes 40a and 42a are sandwiched by the front sheet 4a and the back sheet 4b, heating and pressurizing are subsequently performed by a heat fusion jig from the outside of the sheets 4a in the Z-axis direction. At this time, the sealing tapes 40a and 42a, which serve as an adhesive resin melted by pressurizing and heating, are adhered to and integrated with the inner layer 4B of the exterior sheet 4 and turned into the seal parts 40 and 42 after solidification. During the fusion of the tapes 40a and 42a, the resin constituting the tapes 40a and 42a preferably overflows and covers an exposed surface of the metal sheet 4A located at the leading end part 4d1 (4d2) of the front sheet 4a in the X-axis direction. This is to prevent a short-circuit failure.

Before or after that, the third seal part 44 is formed by pressurizing and heating the folded-back peripheral part 4c of the exterior sheet 4. Next, the electrolyte is injected from an open end 52 of the exterior sheet 4, where the fourth seal part 46 is not formed, and the last fourth seal part 46 is thereafter formed by heat sealing using a jig similar to the jig for forming the third seal part 44. After that, the exterior sheet 4 is cut off along a cutting line 54 outside the fourth seal part 46 so as to remove an extra exterior sheet 4'. Then, the EDLC 2 of the present embodiment is obtained.

In the present embodiment, the first seal part 40 is formed by heat sealing (heating and pressurizing) the sealing tape 40a stuck to the first leading terminal 18 with the inner layer 4B of the exterior sheet 4. Likewise, the second seal part 42 is formed by heat sealing (heating and pressurizing) the sealing tape 42a stuck to the second leading terminal 28 with the inner layer 4B of the exterior sheet 4.

In the present embodiment, for example, the EDLC 2 can have a maximum thickness of 1 mm or less, preferably 0.9 mm or less, more preferably 0.5 mm or less.

Second Embodiment

Figure 1B:
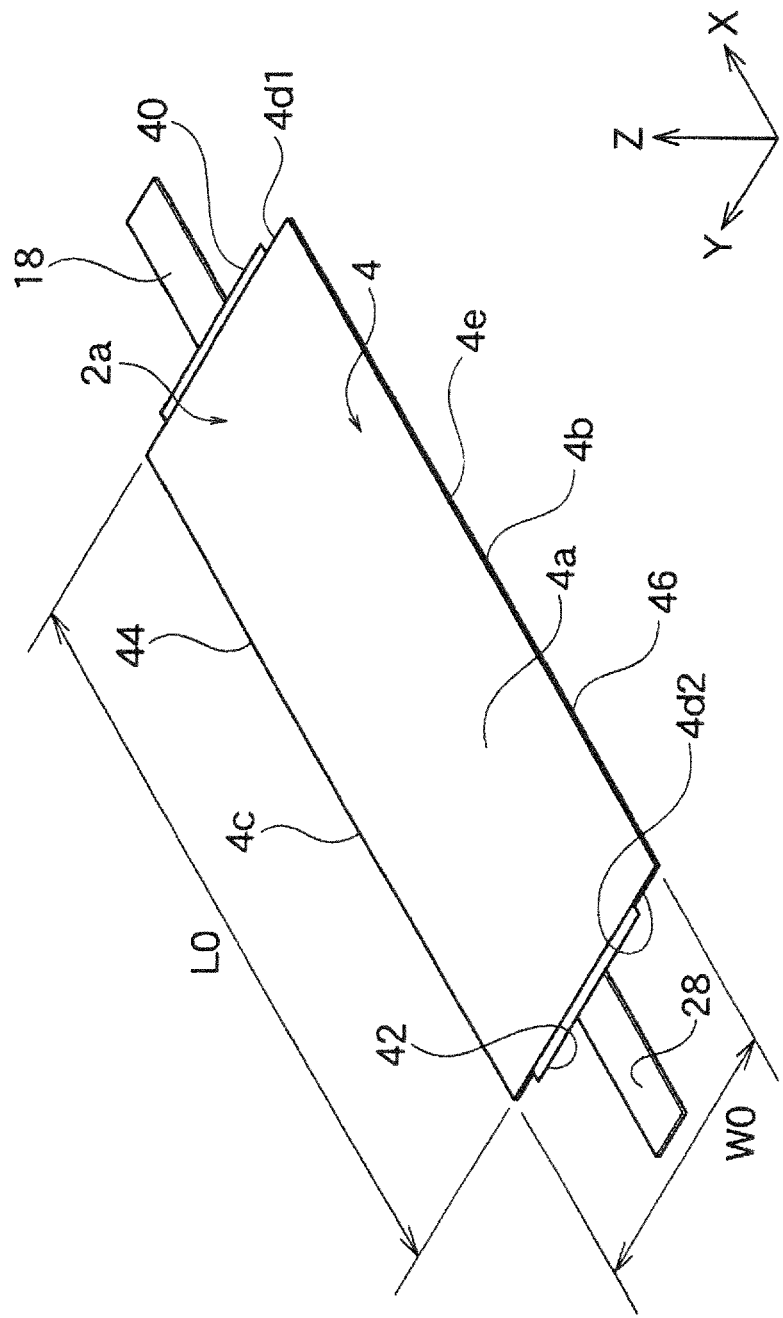
FIG. 1B is a perspective view of an electric double-layer capacitor of another embodiment of the present invention.

As shown in FIG. 1B, an EDLC 2a of the present embodiment is similar to the EDLC 2 of First Embodiment except that the support tabs 4f1 and 4f2 shown in FIG. 1A are not included. In the figures, common members are denoted by common reference numerals. Common matters are not explained.

In the present embodiment, the front sheet 4a and the back sheet 4b have substantially the same length in the X-axis direction and may be formed by folding the same piece of exterior sheet 4 or by separate sheets.

Third Embodiment

Figure 5:
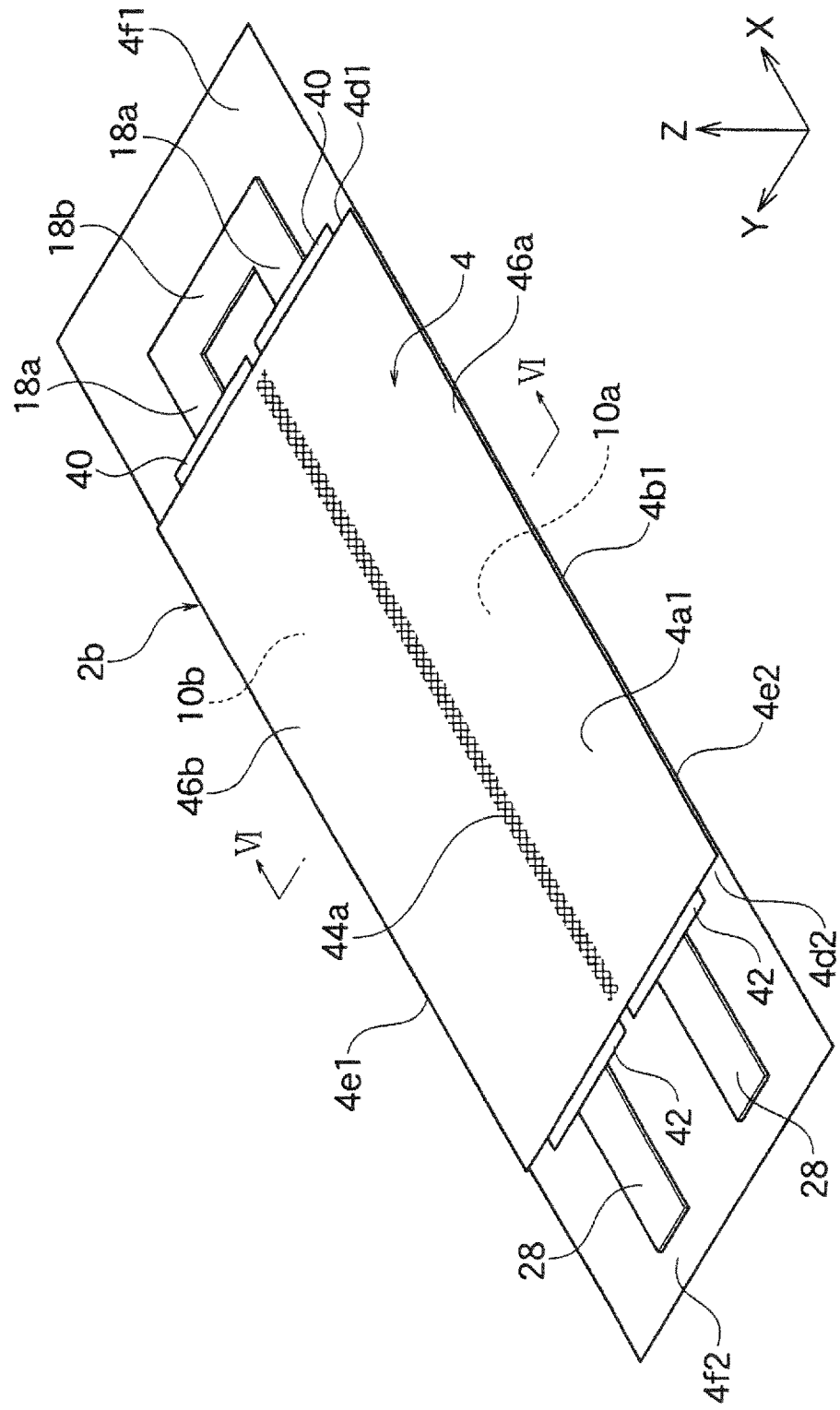
FIG. 5 is a perspective view of an electric double-layer capacitor of another embodiment of the present invention.
Figure 6:
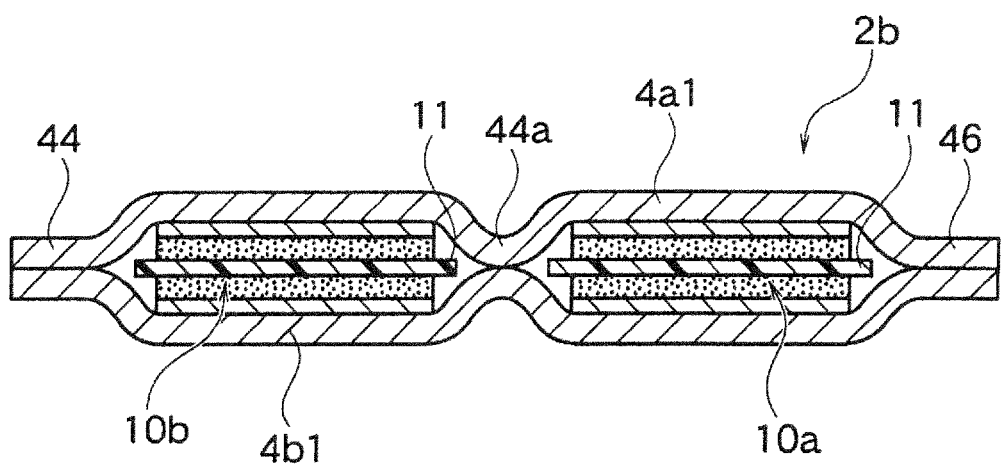
FIG. 6 is a cross-sectional view of a main part taken along a line VI-VI of FIG. 5.

As shown in FIG. 5 and FIG. 6, an EDLC 2b of the present embodiment includes two element bodies 10a and 10b placed side by side in the Y-axis direction inside the exterior sheet 4. The other parts are similar to First Embodiment. Thus, common members are denoted by common reference numerals in the figures, common matters are not partially explained, and different matters are explained in detail.

In the present embodiment, the exterior sheet 4 consists of a front sheet 4a1 and a back sheet 4b1 and is substantially twice as large as the exterior sheet 4 shown in FIG. 1A in the Y-axis direction. As shown in FIG. 6, two element bodies 10a and 10b are housed in the exterior sheet 4. Each of the element bodies 10a and 10b has a similar structure to the element body 10 of First Embodiment.

In the present embodiment, the second leading terminals 28 and 28 of the element bodies 10a and 10b are formed separately, but the respective first leading terminals 18a of the element bodies 10a and 10b are formed integrally with the connection part 18b and are continued with each other. That is, as shown in FIG. 5, the respective element bodies 10a and 10b are connected in series via the first leading terminals 18a and the connection part 18b. In the illustrated example, a pair of first leading terminals 18a and 18a is connected in series via the connection part 18b, but the pair of first leading terminals 18a and 18a may also directly and separately extend on the support tab 4f1 without disposing the connection part 18b.

A third seal part 44a is formed along the X-axis direction in the middle of the exterior sheet 4 in the Y-axis direction, and an electrolyte is separated between the element bodies 10a and 10b. A space for accommodating the element body 10a is sealed by the first seal part 40, the second seal part 42, the third seal part 44a, and a fourth seal part 46a, all of which are continuously formed on the exterior sheet 4, and the space is filled with the electrolyte. Likewise, a space for accommodating the element body 10b is sealed by the first seal part 40, the second seal part 42, the third seal part 44a, and the fourth seal part 46b, all of which are continuously formed on the exterior sheet 4, and the space is filled with the electrolyte.

In the present embodiment, the leading terminals extending to the same side in the X-axis direction are connected in series or in parallel by a connection piece or so, and it is thereby possible to increase the capacity of the battery and the withstand voltage. The present embodiment also includes the support tabs 4f1 and 4f2 as shown in FIG. 1A and can thereby effectively prevent the leading terminals 28 and 18a and the connection part 18b from bending.

In the present embodiment, by keeping the terminal thickness Z3 and the thickness (Z1+Z2) of the seal part 40 (42) at a position where the terminal 18 (28) extends outward in a predetermined relation in the seal part 40 (42) as shown in FIG. 2B, the EDLC 2b can have a long lifetime. Other features and effects of the present embodiment are similar to those of the above-mentioned embodiments.

Fourth Embodiment

Figure 7:
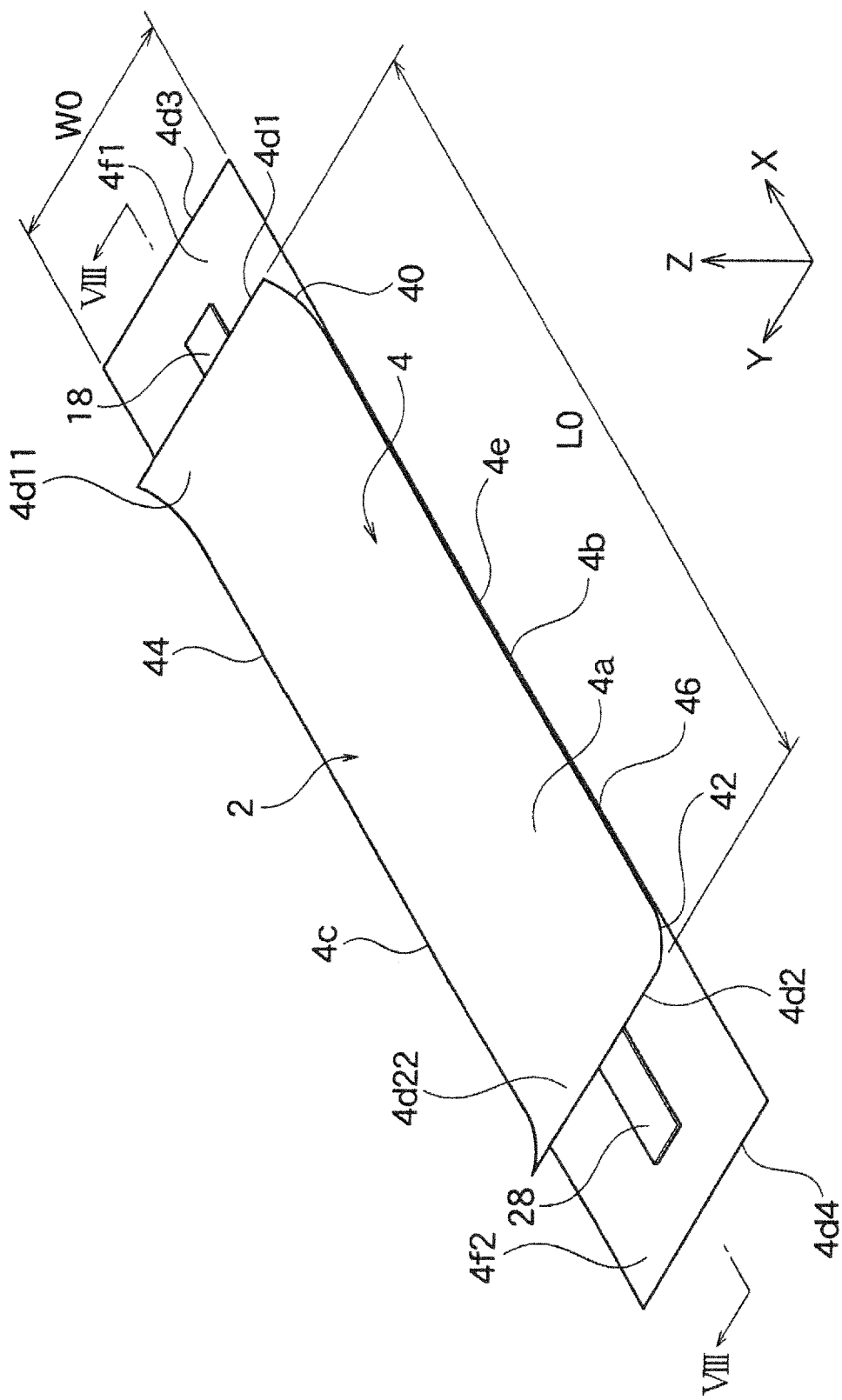
FIG. 7 is a perspective view of an electric double-layer capacitor of another embodiment of the present invention.
Figure 8:
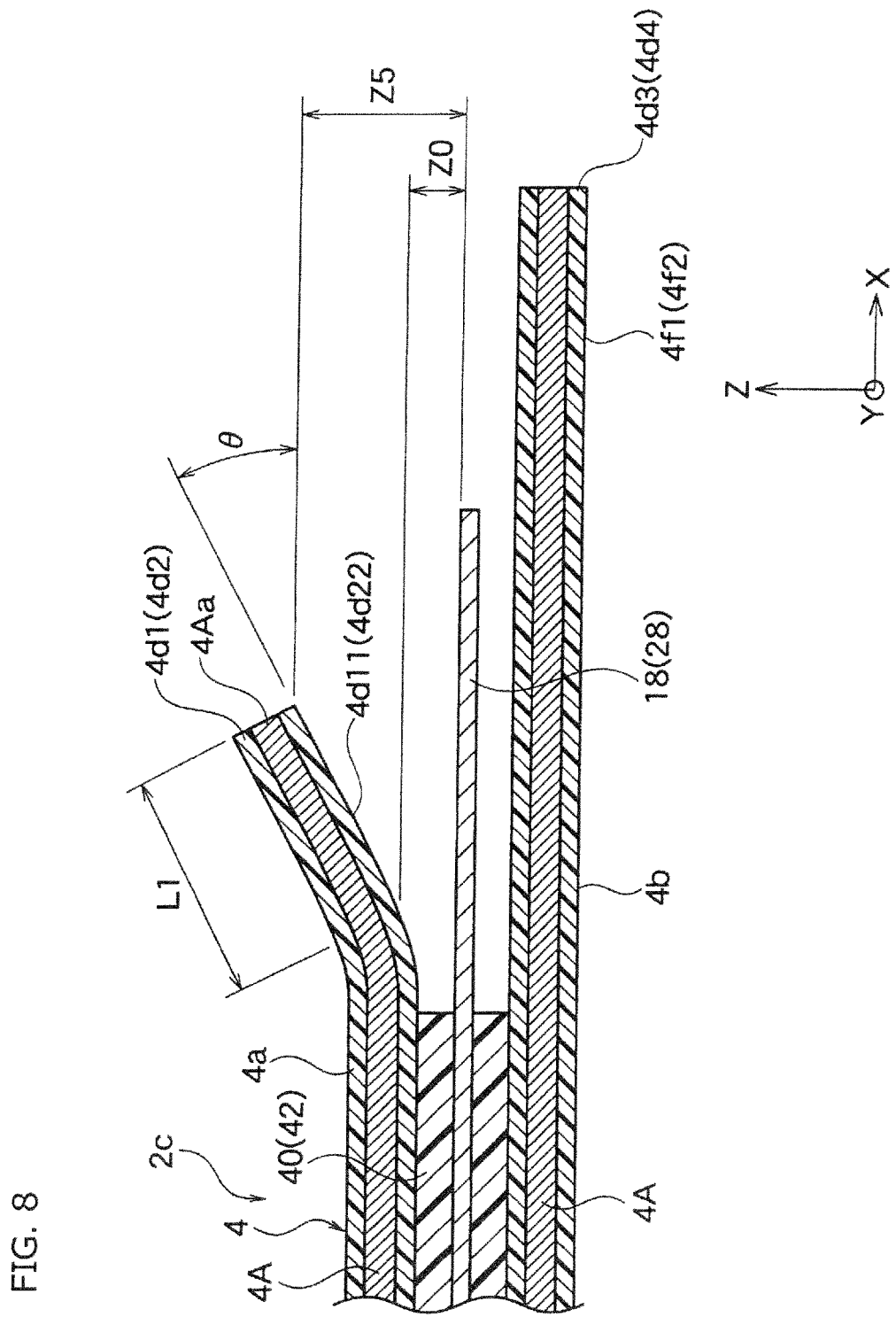
FIG. 8 is a cross-sectional view of a main part taken along a line VIII-VIII of FIG. 7.

As shown in FIG. 7 and FIG. 8, in an EDLC 2c of the present embodiment, in a location where the leading terminal 18 (28) extends outward, the leading end part 4d1 (4d2) of the front sheet 4a of the exterior sheet 4 deviates from the X-axis direction and is bent outward so as to separate from the leading terminal 18 (28). Apart from that, the EDLC 2c of the present embodiment is similar to the EDLC 2 of First Embodiment. In the figures, common members are denoted by common reference numerals. Common matters are not explained.

In the present embodiment, even if the leading end of the metal sheet 4A is exposed in the leading end part 4d1 (4d2) of the front sheet 4a as shown in FIG. 8, it is possible to effectively prevent a short-circuit failure between the leading terminal 18 (28) and the exposed leading end 4Aa of the metal sheet 4A because it is possible to increase a leading end clearance distance Z5 between the leading terminal 18 (28) and an exposed leading end 4Aa of the metal sheet 4A. Incidentally, the leading end part 4d1 (4d2) of the front sheet 4a is located inside the leading end part of the leading terminal 18 (28) in the X-axis direction (the extending direction of the leading terminals 18 and 28). Thus, the leading terminal 18 (28) is easily connected to an external circuit.

In the present embodiment, the clearance distance Z5 between the leading terminal 18 (28) and the exposed leading end 4Aa of the metal sheet 4A, which is a distance at a position outside the seal part 40 in the X-axis direction, is larger than a minimum clearance distance Z0 (corresponding to Z1 or Z2 of First Embodiment) between the leading terminal 18 (28) and the metal sheet 4A in a location corresponding to the seal part 40 (42). This structure effectively prevents the short-circuit failure.

In the present embodiment, a bend angle θ of the leading end part 4d1 (4d2) of the exterior sheet 4 from the leading terminal 18 (28) is preferably 5 degrees or more and 70 degrees or less, more preferably 5 to 60 degrees. This structure further effectively prevents the short-circuit failure, reduces cracking, and improves a strength against repeated bending of EDLC 2c.

In the present embodiment, a length L1 of a bending portion 4d11 (4d22) bending so as to separate from the leading terminal 18 (28) is preferably 100 μm or more and 2000 μm or less in the leading position of the leading terminal 18 (28). At a position where the terminal 18 (28) extends outward, as shown in FIG. 8, the leading end part 4d1 (4d2) of the front sheet 4a extends while increasing a distance from the leading terminal 18 (28), and the extending direction of the leading end part 4d1 (4d2) deviates from the extending direction of the leading terminal 18 (28). This structure can effectively prevent the short-circuit failure.

Incidentally, the bending portion 4d11 (4d22) is a leading end of the front sheet 4a (exterior sheet 4) bending in the Z-axis direction. At this leading end, a distance from the metal sheet 4A to the leading terminal 18 (28) is larger than a minimum clearance distance Z0 between the leading terminal 18 (28) and the metal sheet 4A at a position corresponding to the seal part 40 (42). The bending portion 4d11 (4d22) may be straight shape or curve shape on the cross section shown in FIG. 8.

The length L1 of the bending portion 4d11 (4d22) is a length along the surface of the sheet 4a. When the bending portion 4d11 (4d22) has a curve shape, the length L1 of the bending portion 4d11 (4d22) is a length obtained by stretching the bending portion 4d11 (4d22) into a straight shape. When the bending portion 4d11 (4d22) has a curve shape, a bending angle θ is defined as an angle between the extending direction of the leading terminal 18 (28) and a virtual line connecting between the leading end part 4d1 (4d2) of the sheet 4a with the leading end clearance distance Z5 and the starting point of the bending portion 4d11 (4d22) with the minimum clearance distance Z0.

In the present embodiment, the minimum clearance distance Z0 is preferably 15 μm or more and 60 μm or less, more preferably 15 μm or more and 30 μm or less. This structure reduces the thickness of the device while the device is sealed and increases the lifetime.

The leading end clearance distance Z5 is preferably 24 μm or more and 1748 μm or less, more preferably 24 μm or more and 485 μm or less. This structure effectively prevents short-circuit failure.

In particular, when the EDLC 2c of the present embodiment is manufactured, it is not necessary to control a protrusion amount of the seal part 40 (42) from the leading end part 4d1 (4d2) of the front sheet 4a. The seal part 40 (42) may slightly protrude from the leading end part 4d1 (4d2) of the front sheet 4a. Thus, the EDLC 2c of the present embodiment is easily manufactured.

Incidentally, a jig for bending portion is not the only one means for forming the bending portion 4d11 (4d22) at the leading end part 4d1 (4d2) of the sheet 4a constituting the exterior sheet 4. For example, the leading end part 4d1 (4d2) of the sheet 4a may be bent outward after the seal part 40 (42) is formed by a normal method.

In the present embodiment, a part of the adhesive resin constituting the seal part 40 (42) may be spread so as to fill at least a part of the space between the leading terminal 18 (28) and the leading end part 4d1 (4d2) of the sheet 4a shown in FIG. 8. Instead, an adhesive or resin different from the adhesive resin constituting the seal part 40 (42) may fill at least a part of the space between the leading terminal 18 (28) and the leading end part 4d1 (4d2) of the sheet 4a shown in FIG. 8.

In the present embodiment, by keeping the terminal thickness Z3 and the thickness (Z1+Z2) of the seal part 40 (42) at a position where the terminal 18 (28) extends outward in a predetermined relation, the EDLC 2c shown in FIG. 7 can have a long lifetime. Other features and effects of the present embodiment are similar to those of the above-mentioned embodiments.

Incidentally, the present invention is not limited to the above-mentioned embodiments and may variously be modified within the scope of the present invention.

For example, a lamination-type electrochemical device to which the present invention is applied is not limited to EDLCs and may be applied to lithium battery, lithium battery capacitor, and the like. Specific shape and structure of the electrochemical device are not limited to those of the illustrated examples.

EXAMPLES

Hereinafter, the present invention is described in more detail based on examples, but the present invention is not limited to these examples.

Example 1

A sample of the EDLC 2 shown in FIG. 1A was manufactured. The material of the metal sheet 4A of the exterior sheet 4 of the EDLC 2 was SUS304. The thickness Z3 of the leading terminal 18 (28) shown in FIG. 2B was 60 μm. The thickness (Z1+Z2) of the seal part 40 (42) was 60 μm. Incidentally, the manufacturing error of the thickness Z3 was within ±2 μm, and the manufacturing error of the thickness (Z1+Z2) was ±5 μm or less. The thickness Z4 of the seal part 46 shown in FIG. 2C was 50 μm or less.

100 pieces of the same sample were manufactured, stored in an environment of 60° C.-90% RH, and compared in terms of lifetime based on change in impedance. The lifetime was defined as a storage time when a measurement value of impedance exceeded 300% after impedance was continuously measured (a storage start time of the sample was regarded as zero hour; and a measurement value of impedance at the storage start time was regarded as 100%). An average of the lifetimes of the 100 samples in Example 1 was calculated and considered to be 100%. Table 1 shows the results.

Examples 2 to 24 and Comparative Examples 1 to 5

Except for changing the thickness Z3 of the leading terminal 18 (28) and the thickness (Z1+Z2) of the seal part 40 (42) as shown in Table 1, the samples of the EDLC 2 were manufactured and evaluated in the same manner as Example 1. Table 1 shows the results.

Evaluation

Table 1 shows that the lifetime was improved when Z1+Z2 was 60 μm or less (preferably 40 μm or less) and (Z1+Z2)/Z3 was 0.5 or more and 6.0 or less.

TABLE 1

| | Thickness of lead terminal Z3 (μm) | Thickness of seal part Z1 + Z2 (μm) | Thickness of seal part/Thickness of lead terminal (Z1 + Z2)/Z3 | Lifetime % |
|---|---|---|---|---|
| Ex. 1 | 60 | 60 | 1.00 | 100% |
| Ex. 2 | 60 | 50 | 0.83 | 104% |
| Ex. 3 | 60 | 40 | 0.67 | 109% |
| Ex. 4 | 60 | 30 | 0.50 | 113% |
| Comp. Ex. 1 | 60 | 25 | 0.42 | 44% |
| Ex. 5 | 50 | 60 | 1.20 | 102% |
| Ex. 6 | 50 | 50 | 1.00 | 105% |
| Ex. 7 | 50 | 40 | 0.80 | 109% |
| Ex. 8 | 50 | 30 | 0.60 | 119% |
| Ex. 9 | 50 | 25 | 0.50 | 126% |
| Ex. 10 | 40 | 60 | 1.50 | 102% |
| Ex. 11 | 40 | 50 | 1.25 | 108% |
| Ex. 12 | 40 | 40 | 1.00 | 106% |
| Ex. 13 | 40 | 30 | 0.75 | 122% |
| Ex. 14 | 40 | 25 | 0.63 | 122% |
| Ex. 15 | 30 | 60 | 2.00 | 104% |
| Ex. 16 | 30 | 50 | 1.67 | 111% |
| Ex. 17 | 30 | 40 | 1.33 | 116% |
| Ex. 18 | 30 | 30 | 1.00 | 127% |
| Ex. 19 | 30 | 25 | 0.83 | 127% |
| Ex. 20 | 20 | 60 | 3.00 | 103% |
| Ex. 21 | 20 | 50 | 2.50 | 115% |
| Ex. 22 | 20 | 40 | 2.00 | 116% |
| Ex. 23 | 20 | 30 | 1.50 | 123% |
| Ex. 24 | 20 | 25 | 1.25 | 125% |
| Comp. Ex. 2 | 80 | 80 | 1.00 | 78% |
| Comp. Ex. 3 | 30 | 80 | 2.70 | 66% |
| Comp. Ex. 4 | 50 | 20 | 0.40 | 47% |
| Comp. Ex. 5 | 60 | 150 | 2.50 | 59% |

REFERENCE SIGNS LIST 2, 2a, 2b, 2c . . . electric double-layer capacitor (EDLC)
4 . . . exterior sheet
4a, 4a1 . . . front sheet
4b, 4b1 . . . back sheet
4c . . . folded-back peripheral part
4d1 to 4d4 . . . leading end part
4d11, 4d22 . . . bending portion
4e . . . side peripheral part
4f1, 4f2 . . . support tab
4A . . . metal sheet
4Aa . . . exposed leading end
4B . . . inner layer
4C . . . outer layer
10 . . . element body
11 . . . separator sheet
12 . . . first active layer
14 . . . first current collector layer
16 . . . first inner electrode
18 . . . first leading terminal
22 . . . second active layer
24 . . . second current collector layer
26 . . . second inner electrode
28 . . . second leading terminal
40 . . . first seal part 42 . . . second seal part
44 . . . third seal part
46 . . . fourth seal part

What is claimed is:

1. An electrochemical device comprising:
   an element body including a pair of inner electrodes laminated to sandwich a separator sheet;
   an exterior sheet configured to cover the element body;
   a seal part configured to seal a peripheral part of the exterior sheet for immersing the element body in an electrolyte; and
   a leading terminal extending outward from the seal part of the exterior sheet, wherein
   the exterior sheet includes a front sheet and a back sheet,
   the front sheet includes a front-side metal sheet and a front-side inner layer,
   the back sheet includes a back-side metal sheet and a back-side inner layer,
   at least one of the front-side inner layer and the back-side inner layer is fused and integrated with an adhesive resin at a position of the seal part through which the leading terminal extends,
   $Z1+Z2$ is 60 μm or less and $(Z1+Z2)/Z3$ is 0.5 or more and 6.0 or less at a position of the seal part through which the leading terminal extends, in which $Z1$ is a first thickness of the seal part from a front surface of the leading terminal to the front-side metal sheet, $Z2$ is a second thickness of the seal part from a back surface of the leading terminal to the back-side metal sheet, and $Z3$ is a thickness of the leading terminal, and
   at least of one of $Z1$ and $Z2$ includes a thickness of the adhesive resin.

2. The electrochemical device according to claim 1, wherein the thickness $Z3$ of the leading terminal is 60 μm or less.

3. The electrochemical device according to claim 2, wherein a current collector layer of the inner electrode is formed continuously and integrally with the leading terminal.

4. The electrochemical device according to claim 2, wherein the seal part from the front-side metal sheet to the back-side metal sheet has a thickness of 50 μm or less at a position of the seal part where the leading terminal is not extended.

5. The electrochemical device according to claim 2, wherein
   a leading end part of the back sheet extends outward from a leading end part of the leading terminal in a extending direction of the leading terminal and also functions as a support tab, and
   a leading end part of the front sheet is positioned inside the leading end part of the leading terminal in the extending direction of the leading terminal.

6. The electrochemical device according to claim 1, wherein a current collector layer of the inner electrode is formed continuously and integrally with the leading terminal.

7. The electrochemical device according to claim 1, wherein the seal part from the front-side metal sheet to the back-side metal sheet has a thickness of 50 μm or less at a position of the seal part through which the leading terminal does not extend.

8. The electrochemical device according to claim 1, wherein
   a leading end part of the back sheet extends outward from a leading end part of the leading terminal in a extending direction of the leading terminal and also functions as a support tab, and
   a leading end part of the front sheet is positioned inside the leading end part of the leading terminal in the extending direction of the leading terminal.

9. The electrochemical device according to claim 1, wherein $Z1+Z2$ is 25 μm or more and 50 μm or less.

10. The electrochemical device according to claim 1, wherein $Z1+Z2$ is 40 μm or less.

* * * * *